(12) United States Patent
Sotomayor et al.

(10) Patent No.: US 12,137,497 B2
(45) Date of Patent: Nov. 5, 2024

(54) SYSTEM AND METHOD OF TRACKING A MOBILE DEVICE

(71) Applicant: TRESPASS TRACKER LTD., Aurora (CA)

(72) Inventors: Joel Roberto Sotomayor, Aurora (CA); Idris Soule Alaofe, Hamilton (CA)

(73) Assignee: TRESPASS TRACKER LTD., Aurora (CA)

( * ) Notice: Subject to any disclaimer, the term of this patent is extended or adjusted under 35 U.S.C. 154(b) by 104 days.

(21) Appl. No.: 17/642,418

(22) PCT Filed: Sep. 11, 2020

(86) PCT No.: PCT/CA2020/051227
§ 371 (c)(1),
(2) Date: Mar. 11, 2022

(87) PCT Pub. No.: WO2021/046650
PCT Pub. Date: Mar. 18, 2021

(65) Prior Publication Data
US 2022/0369095 A1 Nov. 17, 2022

Related U.S. Application Data

(60) Provisional application No. 62/899,456, filed on Sep. 12, 2019.

(51) Int. Cl.
*H04M 3/00* (2024.01)
*H04W 8/06* (2009.01)
(Continued)

(52) U.S. Cl.
CPC .............. *H04W 8/18* (2013.01); *H04W 8/06* (2013.01); *H04W 12/121* (2021.01); *H04W 12/63* (2021.01)

(58) Field of Classification Search
CPC ....... H04W 12/12; H04W 12/63; H04W 8/06; H04W 4/029; H04W 64/00; H04W 8/02;
(Continued)

(56) References Cited

U.S. PATENT DOCUMENTS 6,442,392 B2   8/2002  Ruutu
6,810,250 B2  10/2004  Jo
(Continued)

FOREIGN PATENT DOCUMENTS

CA   2815310 C   12/2016
EP   0641137 A2   3/1995
EP   2672744 A1  12/2013

OTHER PUBLICATIONS

Mirsky, Y. et al., DDos Attacks on 9-1-1 Emergency Services, in IEEE Transactions on Dependable and Secure Computing, vol. 18, No. 6, pp. 2767-2786, Nov. 1-Dec. 2021, doi: 10.1109/TDSC.2019.2963856.
(Continued)

*Primary Examiner* — Shantell L Heiber
(74) *Attorney, Agent, or Firm* — Bennett Jones LLP; Salvatore F. Barbieri; Lorelei G. Graham

(57) ABSTRACT

Systems and methods for tracking mobile devices are provided. One system comprises at least one processor and memory storing code which when executed by the at least one processor configure the at least one processor to perform a method of tracking a mobile device. The method comprises receiving a disassemble international mobile subscriber identity (IMSI) attach message from a base station, identifying the identified mobile device within a location area using the IMSI and LAI, receiving a decode and capture message from the base station, and identifying the unidentified mobile device as being the identified mobile device within the location area. The disassemble IMSI attach message includes an IMSI and a location area identity (LAI)
(Continued)

associated with an identified mobile device. The decode and capture message includes a temporary mobile subscriber identity (TMSI) and LAI associated with an unidentified mobile device.

10 Claims, 11 Drawing Sheets

(51) Int. Cl.
*H04W 8/18* (2009.01)
*H04W 12/121* (2021.01)
*H04W 12/63* (2021.01)

(58) Field of Classification Search
CPC ....... H04W 48/16; H04W 8/18; H04W 60/00; H04W 48/10
See application file for complete search history.

(56) References Cited

U.S. PATENT DOCUMENTS

| | | | |
|---|---|---|---|
| 7,280,826 B2 | 10/2007 | Nylander | |
| 8,326,268 B2* | 12/2012 | Ahn | H04W 12/48 455/410 |
| 8,463,297 B2 | 6/2013 | Bull | |
| 8,818,331 B2 | 8/2014 | Mohammed | |
| 8,958,773 B2 | 2/2015 | Mohammed | |
| 9,055,518 B2 | 6/2015 | Vainola | |
| 9,736,689 B2 | 8/2017 | Liu | |
| 9,749,929 B2 | 8/2017 | Chong | |
| 9,860,834 B2 | 1/2018 | Kim | |
| 9,911,103 B2 | 3/2018 | Hodges | |
| 9,918,298 B2 | 3/2018 | Yu | |
| 10,098,019 B2 | 10/2018 | Martin | |
| 10,117,122 B2 | 10/2018 | Martin | |
| 10,462,684 B2 | 10/2019 | Martin | |
| 10,630,410 B2 | 4/2020 | Parkvall | |
| 10,638,253 B1 | 4/2020 | Parkvall | |
| 10,785,708 B2 | 9/2020 | Soule Alaofe | |
| 11,224,004 B2 | 1/2022 | Sotomayor | |
| 2002/0061746 A1 | 5/2002 | Jo | |
| 2007/0082667 A1* | 4/2007 | Redell | H04W 8/26 455/432.1 |
| 2009/0029684 A1* | 1/2009 | Rosenblatt | H04W 8/06 455/456.2 |
| 2009/0170528 A1 | 7/2009 | Bull | |
| 2009/0305668 A1 | 12/2009 | Ahn | |
| 2012/0095905 A1 | 4/2012 | Hodges | |
| 2012/0208532 A1 | 8/2012 | Liu | |
| 2012/0264466 A1* | 10/2012 | Vainola | H04W 48/18 455/500 |
| 2014/0199962 A1 | 7/2014 | Mohammed | |
| 2014/0357222 A1 | 12/2014 | Mohammed | |
| 2016/0219503 A1 | 7/2016 | Kim | |
| 2016/0286523 A1 | 9/2016 | Yu | |
| 2017/0201925 A1 | 7/2017 | Chong | |
| 2017/0311195 A1 | 10/2017 | Martin | |
| 2017/0331577 A1 | 11/2017 | Parkvall | |
| 2017/0339580 A1 | 11/2017 | Martin | |
| 2018/0035295 A1 | 2/2018 | Liu | |
| 2018/0160291 A1 | 6/2018 | Burgert | |
| 2018/0176981 A1* | 6/2018 | Baer | H04W 76/50 |
| 2019/0021014 A1 | 1/2019 | Martin | |
| 2019/0037431 A1 | 1/2019 | Martin | |
| 2020/0084701 A1 | 3/2020 | Soule Alaofe | |
| 2020/0120482 A1 | 4/2020 | Parkvall | |
| 2020/0236549 A1 | 7/2020 | Liu | |
| 2022/0132398 A1 | 4/2022 | Sotomayor | |

OTHER PUBLICATIONS

Office Action issued in U.S. Appl. No. 16/569,180 on Feb. 10, 2020.
Notice of Allowance issued in U.S. Appl. No. 16/569,180 on May 15, 2020.
International Search Report + Written Opinion issued in PCT/CA2020/051227 on Oct. 22, 2020.
Vohra, D. et al., Investigating GSM Control Channels with RTL-SDR and GNU Radio, 2016 International Conference on Wireless Communications, Signal Processing and Networking (WiSPNET), Sep. 2016.
Xenakis, C. et al., Attacking the baseband modem of mobile phones to breach the users' privacy and network security, 2015 7th International Conference on Cyber Conflict: Architectures in Cyberspace, Jul. 2015.
Office Action issued in U.S. Appl. No. 17/026,733 on Feb. 4, 2021.
Notice of Allowance issued in U.S. Appl. No. 17/026,733 on May 5, 2021.

* cited by examiner

SYSTEM AND METHOD OF TRACKING A MOBILE DEVICE

CROSS REFERENCE TO RELATED APPLICATIONS

This application is a national stage entry of PCT/CA2020/051227 filed Sep. 11, 2020, which claims the benefit of and priority to U.S. provisional application No. 62/899,456 filed Sep. 12, 2019, the contents of all of which are hereby incorporated by reference.

FIELD

The present disclosure generally relates to tracking devices, and in particular to a system and method of tracking a mobile device.

INTRODUCTION

Unauthorized individuals may attempt to enter a premises. It is desirable to be able to track individuals that attempt to enter a premises.

SUMMARY

In accordance with an aspect, there is provided a system for tracking a mobile device. The system comprises a processor and memory storing code which when executed by the processor configure the processor to receive a disassemble international mobile subscriber identity (IMSI) attach message from a base station, identify the identified mobile device within a location area using the IMSI and LAI, receive a decode and capture message from the base station, and identify the unidentified mobile device as being the identified mobile device within the location area. The disassemble IMSI attach message includes an IMSI and a location area identity (LAI) associated with an identified mobile device. The decode and capture message includes a temporary mobile subscriber identity (TMSI) and LAI associated with an unidentified mobile device.

In accordance with another aspect, there is provided a method for tracking a mobile device. The method comprises receiving a disassemble international mobile subscriber identity (IMSI) attach message from a base station, identifying the identified mobile device within a location area using the IMSI and LAI, receiving a decode and capture message from the base station, and identifying the unidentified mobile device as being the identified mobile device within the location area. The disassemble IMSI attach message includes an IMSI and a location area identity (LAI) associated with an identified mobile device. The decode and capture message includes a temporary mobile subscriber identity (TMSI) and LAI associated with an unidentified mobile device.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Embodiments of methods, systems, and apparatus are described through reference to the drawings.

The Third Generation Partnership Project (3GPP) specification for Layers 2 & 3 of the Global Systems for Mobile communication (GSM) protocol may be loose in specific sections—causing network operators to have implementation deficiencies. These built-in differences and deficiencies allow for surface layer identification and passive tracking. Intruders or trespassers may be passively tracked and identified on varying properties through the use of GSM signals emitted by their cellular devices. In some embodiments, a software-defined radio (SDR) may be developed to track such cellular devices. An SDR may comprise hardware, which is able to receive (listen) to the frequencies in the GSM band, coupled with in-house algorithms implemented in software to make sense of the data.

Before a capture can take place, a hardware device may be used to channel in the GSM frequencies from the radiolink through an Um interface. The hardware device may be configured to detect GSM and Long-Term Evolution (LTE) frequencies. In some embodiment, a hardware system may be used to connect with the Um interface. In some embodiments, an SDR may be used to connect with the Um interface, where the tuning functionality is implemented in software. This SDR may be coupled with an Omni-directional antennae to feed into a monitoring system.

Figure 1:
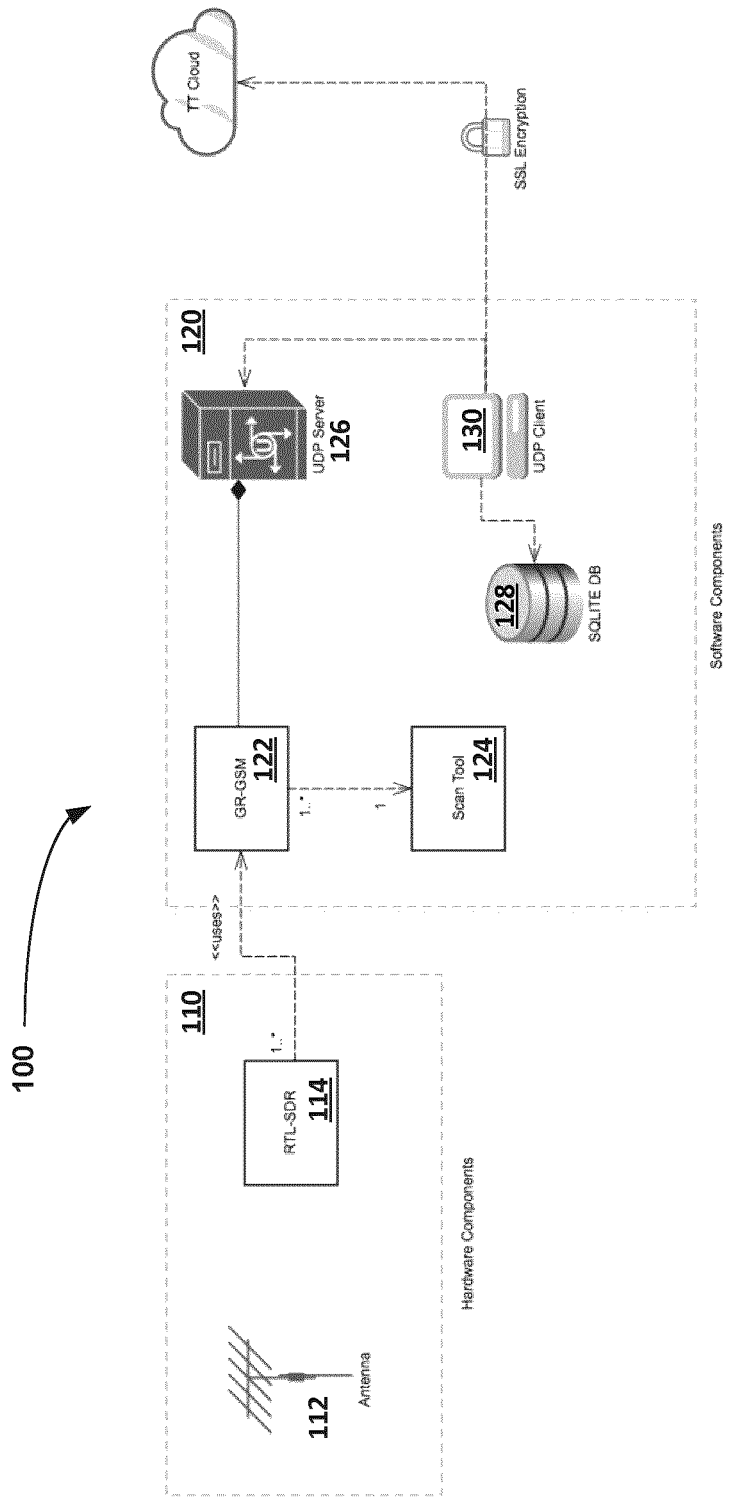
FIG. 1 illustrates, in a schematic diagram, an example of a tracking system architecture, in accordance with some embodiments.

FIG. 1 illustrates, in a schematic diagram, an example of a device tracking system 100 architecture, in accordance with some embodiments. The system 100 includes hardware (HW) 110 and software (SW) 120 components. The hardware components 110 include an antenna 112 and a register-transfer level (RTL)-SDR device 114. The software components 120 include a GR-GSM 122 module, a scan tool 124, a user datagram protocol (UDP) server 126, a database 128 and a UDP client 130.

Figure 2A:
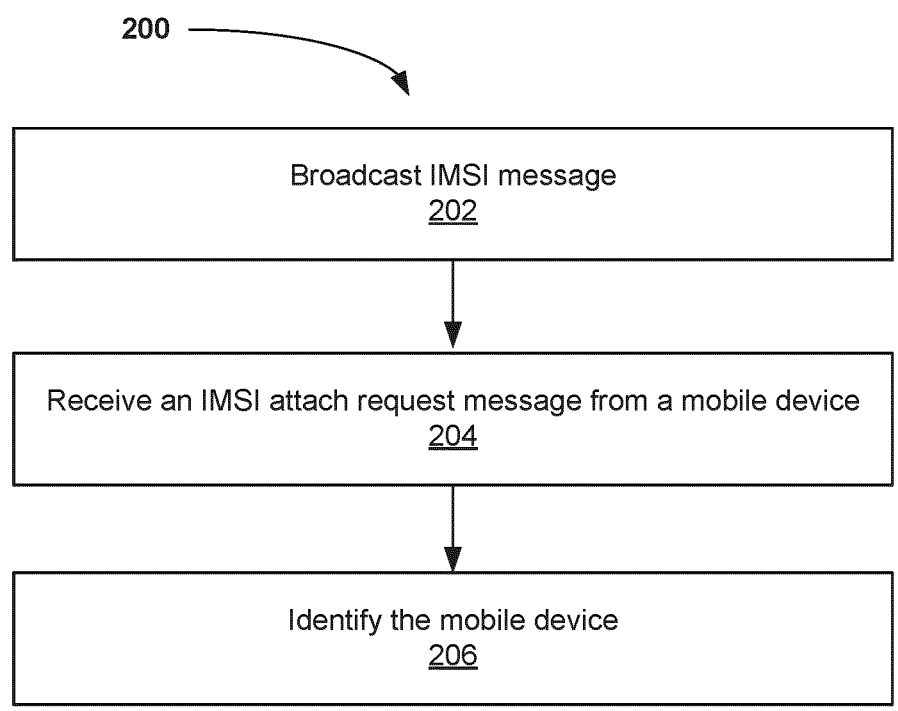
FIG. 2A illustrates, in a flowchart, an example of a method of tracking a mobile device, in accordance with some embodiments.

FIG. 2A illustrates, in a flowchart, an example of a method 200 of tracking a mobile device, in accordance with some embodiments. The method 200 comprises broadcasting 202 an IMSI message, receiving 204 an IMSI attach request message from a mobile device, and identifying 206 the mobile device. Other steps may be added to the method 200.

Figure 2B:
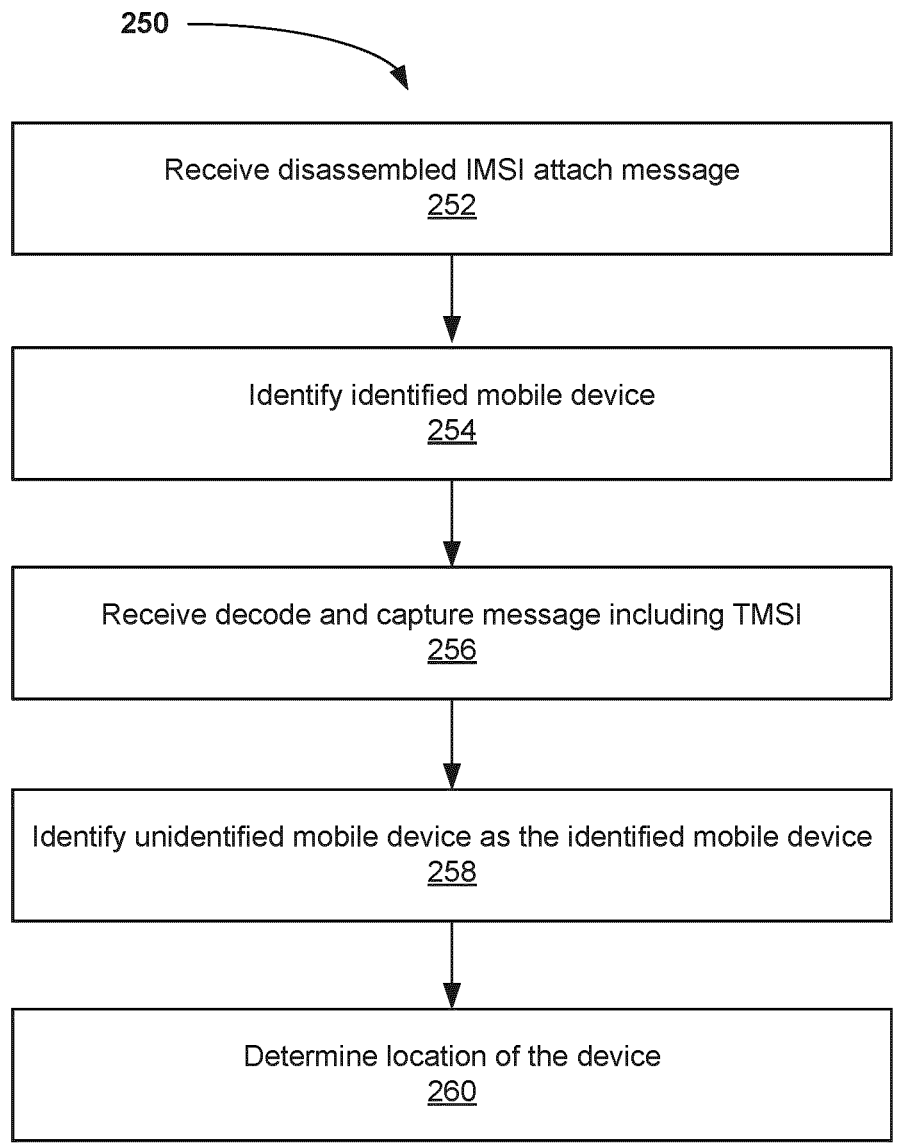
FIG. 2B illustrates, in a flowchart, another example of a method of tracking a mobile device, in accordance with some embodiments.

FIG. 2B illustrates, in a flowchart, another example of a method 250 of tracking a mobile device, in accordance with some embodiments. The method 250 comprises receiving 252 a disassemble international mobile subscriber identity (IMSI) attach message from a base station. The disassemble IMSI attach message includes an IMSI and a location area identity (LAI) associated with an identified mobile device. Next the mobile device is identified 254 as within a location area. Next, a decode and capture message is received 256 from the base station. The decode and capture message includes a temporary mobile subscriber identity (TMSI) and LAI associated with an unidentified mobile device. Based on the location and timing of the IMSI and TMSI, the unidentified mobile device is identified 258 as the identified mobile device within the location area. Next, the location of the now identified mobile device is determined 260. Other steps may be added to the method 250.

In some embodiments, mobile devices may be whitelisted based on their IMSI. Thus, when the device is identified, it can be determined that it is not an intruder device. In some embodiments, mobile devices may be blacklisted based on their IMSI. Thus, when the device is identified, it can be determined that it is an intruder device. IN some embodiments, devices that are not whitelisted may be determined to be intruder devices, or guest devices with lower privileges, by default.

In some embodiments, devices that are whitelisted or blacklisted may have their IMSIs stored in a database. Thus, the method 250 may be modified to begin with the storing of the IMSIs in a database and then proceed to the receipt of the decode and capture message including the TMSI 256.

In addition to the RTL-SDR 114 hardware, there is functionality to listen to Bluetooth™ Low Energy (BLE) packets (e.g., in sniff mode), which has the dual functionality of identifying "friendlies" and intruders alike. The use case presented herein includes a BLE card that can be sensed on the premises to determine if employees have entered a particular region. As will be detailed further below, this can also aid in distinguishing intruders from those who can legally enter, or have the right be on, the premises.

The software 120 in the system 100 may route, dissect and perform stateful inspection of GSM/LTE packets. The system 100 may be used to determine who (generically) is on the property, and approximately (to produce an n-sigma distance—statistically) where they are. Since the 3GGP standard leaves implementation dependent behavior, this allows the system 100 leeway from the GSM perspective of stateful inspection. A principle of cellular communication is the ability to identify a mobile station (MS) on the serial number (SN). The international mobile subscriber identity (IMSI) is a component that provides for unique identification. Due to security concerns, the IMSI rarely broadcasts. As a result the temporary mobile subscriber identity (TMSI)/Packet (P)-TMSI and the global unique temporary identifier (GUTI) (i.e., for LTE/Fourth Generation (4G)) is broadcast. It should be noted that these replacements for the IMSI are randomly generated and in some cases use a uniform distribution. They are 32-bits long and can take on any value from the set over which 32-bits (unsigned) are defined except for 0xFFFFFFFF (used for subscriber identity module (SIM)). For a given location area code (LAC) and MSs in the area, regeneration of the same TMSI/P-TMSI/GUTI (herein referred to as TMSI) is not likely. This problem then becomes random sampling on U for size $X=2^{32}-1$ and sample size Y (i.e., the Birthday Problem). For example:

$$\mathbb{P}(Z(i))=P(N(i)\leq 1)=(1-X^{-1})^{Y}+Y(1-X^{-1})^{Y-1}(1/X)$$

where Z(i) is 1 when there is another TMSI duplicated from [0,U] exclusive of the special value 0xFFFFFFFF, and 0 otherwise. Then, the equation may be equally derived for the expected value for a collision with Y samples. Trivially, it is as follows:

$$E(\text{collisions})=Y+X(1-X^{-1})^{Y}-X$$

which works such that Y MSs would have the possibility to have at most Y collisions. Considering that $1/2^{32}-1$ is near 10 billionths, the likelihood function would work out that this is near impossible and high improbable. Given 330 million people in the US all located in the same LAC (if it was even theoretically possible) would still prove the likelihood would be low (e.g., 7.69%). Thus, for sufficiently small Y the likelihood drastically rolls off logarithmically.

Figure 3:
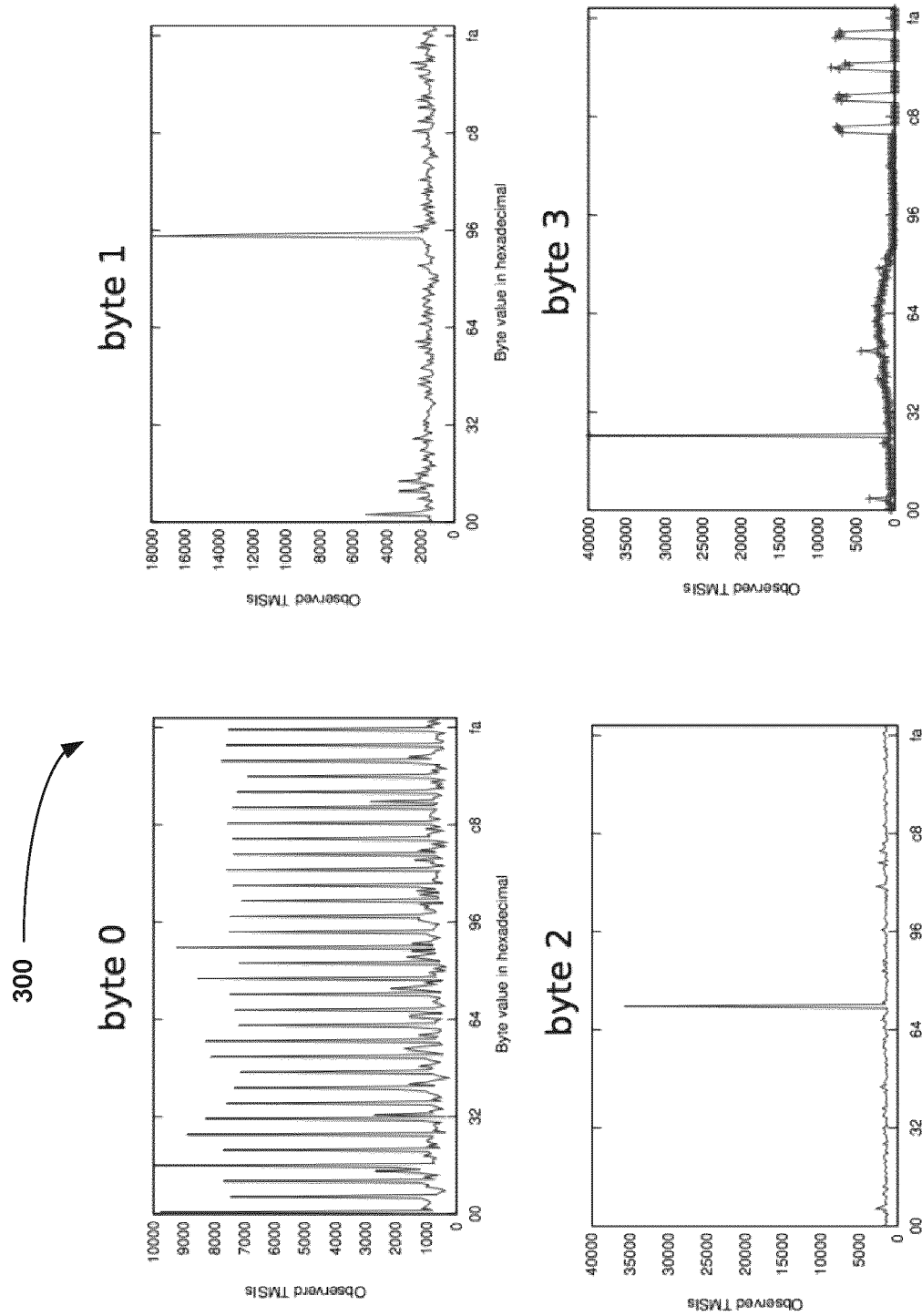
FIG. 3 illustrates, in plot diagrams, temporary mobile subscriber identity (TMSI) distribution of mobile devices serial numbers (SNs) in Europe.

This may then provide confidence to an algorithm that once a TMSI is obtained, it belongs to a particular MS for the given session in the specific LAC in which the system 100 is listening. FIG. 3 illustrates, in plot diagrams, this TMSI distribution of mobile device serial SNs in Europe 300. As can be seen in the plot diagrams, the distribution is fairly even with the exception of a few points. Therefore, the likelihood of a mobile device to have the same TMSI as another mobile device is very low.

Internally, the system 100 core may comprise stateful GSM packet inspection using a Finite Automaton. Times as to when IMSIs and TMSIs are broadcast through this inspection along with the 3GPP protocol specification may be identified:
1. MS is in MS::IDLE state just entering an LA
2. MS is moving between two LAs
3. Paging Request (All types) in an LA
4. Location Update (Normal, Periodic, IMSI Attach)
5. Phone Switched Off (IMSI Detach)
6. CM Service Request (SMS, Broadcast)

The following outlines various software proposed solutions to handle these cases and sub-cases for the GSM case.

For a Finite State Machine (FSM) this initially would be the first state. MSs that come into the location area (LA) through various means could be marked: cellular switched on, SIM inserted, or network coverage restored. This case is unique in that an MS will reach to the visitor location register (VLR). However, there are multiple cases, especially in remote areas, where the VLR is either down temporarily, low in static-ram or not available, causing a hit to the home location register (HLR) and forcing the IMSI to be sent. Other cases such as a normal update where are pull from the VLR without HLR intervention still sends the IMSI (most likely the case is that VLRs internal cache was cleared) as seen, in the example of a GSM packet structure, below:

▼ GSM A-I/F DTAP—Location Updating Request
   ▼ Protocol Discriminator: Mobility Management messages (5)
      . . . 0101=Protocol discriminator: Mobility Management messages (0x5)
      0000 . . . =Skip Indicator: No indication of selected PLMN(0)
      00 . . . =Sequence number: 0
      . . . 00 1000=DTAP Mobility Management Message Type: Location Updating Request (0x08)
   ▶ Ciphering Key Sequence Number
   ▼ Location Updating Type—Normal
      . . . 0 . . . =Follow-On Request (FOR): No follow-on request pending
      . . . 0 . . . =Spare bit(s): 0
      . . . 00=Updating Type: Normal (0)
   ▶ Location Area Identification (LAI)
   ▼ Mobile Station Classmark 1
   ▼ Mobile Station Classmark 1
      0 . . . =Spare: 0
      0.10 . . . =Revision Level: Used by mobile stations supporting R99 or later versions of the protocol (2)
      . . . 1 . . . =ES IND: Controlled Early Classmark Sending option is implemented in the MS
      . . . 0 . . . =A5/1 algorithm supported: encryption algorithm A5/1 available
      . . . 0.011=RF Power Capability: class 4 (3)
▼ Mobile Identity—IMSI (310410530578733)
Length: 8
0011 . . . =Identity Digit 1: 3
. . . 1 . . . =Odd/even indication: Odd number of identity digits
. . . 0.001=Mobile Identity Type: IMSI (1)
▼ IMSI: 310410530578733
Mobile Country Code (MCC): United States (310)
Mobile Network Code (MNC): AT&T Mobility (410)

Now the ability to link an IMSI to a unique identifier in the system 100 can be made. Furthermore, should the MS remain on a particular property in the LA once location updates happen (i.e., if the network operator has opted to follow specification) then multiple TMSIs (e.g., once every 24 minutes) may be tied to an IMSI for the given session.

Two operations of system 100 implemented in software allow for the matching of an IMSI to a TMSI upon receipt of an IMSI Attach message by the system 100 and passively tracking an MS through a complex set of sub-states via a Location Update GSM Procedure. An internal Finite State Machine will start off in the IMSI Attach state of which the system 100 will then wait for messages that match the state and use the database for insert, deletion and retrieval of MS related (meta)data based on packet analysis.

Figure 4:
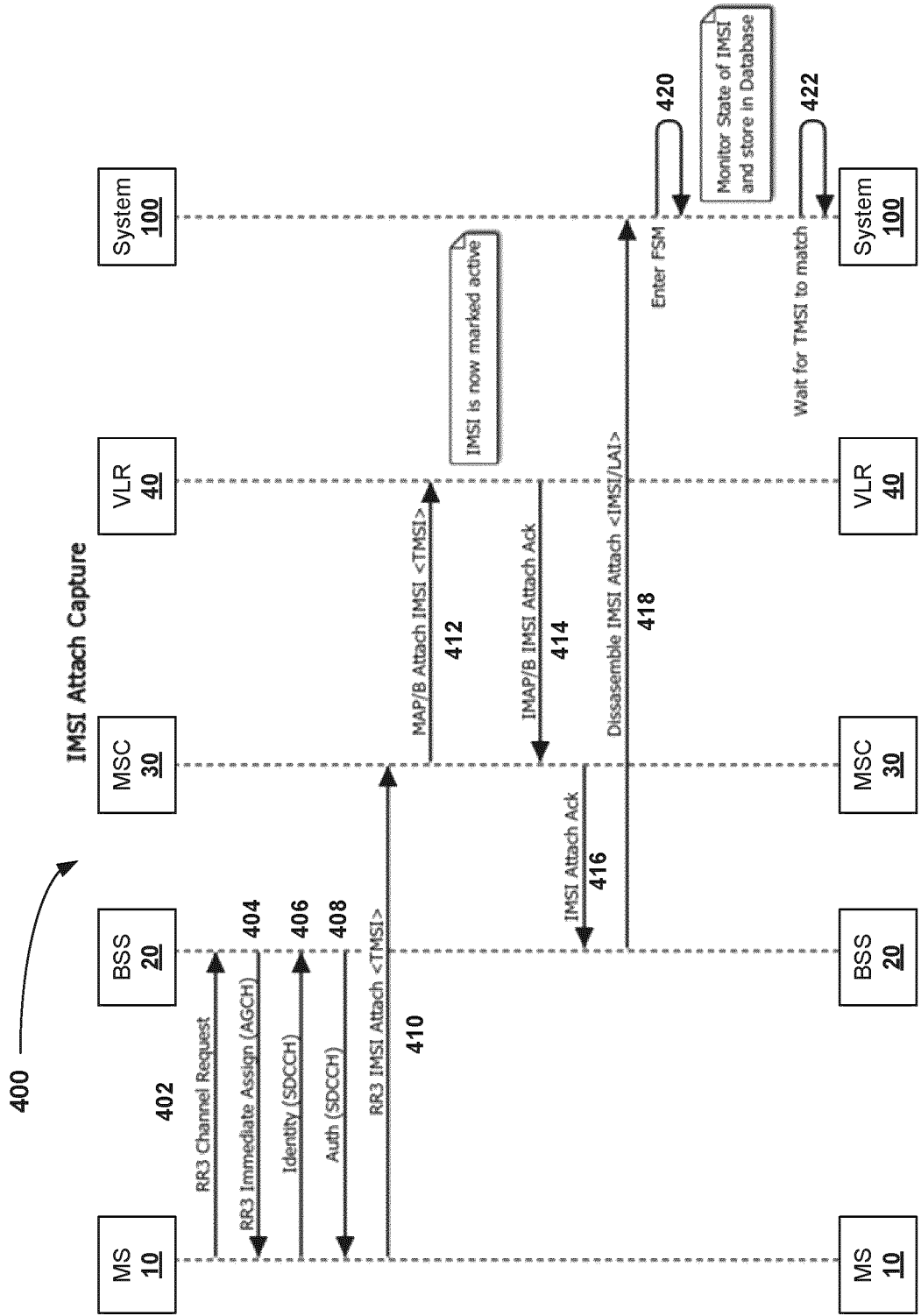
FIG. 4 illustrates, in a sequence diagram, an example of a method of the interception of a message showing an international mobile subscriber identity (IMSI) Attach capture, in accordance with some embodiments.

FIG. 4 illustrates, in a sequence diagram, an example of a method 400 of the interception of a message showing an IMSI Attach capture, in accordance with some embodiments. The method 400 comprises a MS 10 sending a RR3 Channel Request message 402 to a base station (BSS) 20. The BSS 20 sends a RR3 Immediate Assign (AGCH) message 404 to the MS 10. Next, the MS 10 sends an Identity (SDCCH) message 406 to the BSS 20. The BSS 20 sends an Auth (SDCCH) message 408 to the MS 10. Next, the MS 10 sends a RR3 IMSI Attach <TMSI> message 410 to a mobile station centre (MSC) 30. The MSC 30 then sends a MAP/B Attach IMSI <TMSI> message 412 to a visitor location register (VLR) 40. The IMSI may be marked as active. The VLR 40 sends an IMAP/B IMSI Attach Ack message 414 to the MSC 30. The MSC 30 then sends an IMSI Attach Ack message 416 to the BSS 20. The BSS 20 sends a Disassemble IMSI Attach <IMSI/LAI> message 418 to the system 100. The system 100 enters 420 a finite state machine (FSM) where the system 100 monitors the state of the IMSI and stores it in the database 128. The system 100 then waits 422 for a matching TMSI.

System 100, for a majority of the time, will execute in the Location Updating State and the three sub-states: normal, IMSI Attach and periodic (with Timer T3212). Moreover, a majority of the passive tracking and geolocation position awareness will happen through these sub-states. Initially a message will trigger this state (particularly if the MS is already registered in the system 100 database).

Figure 5:
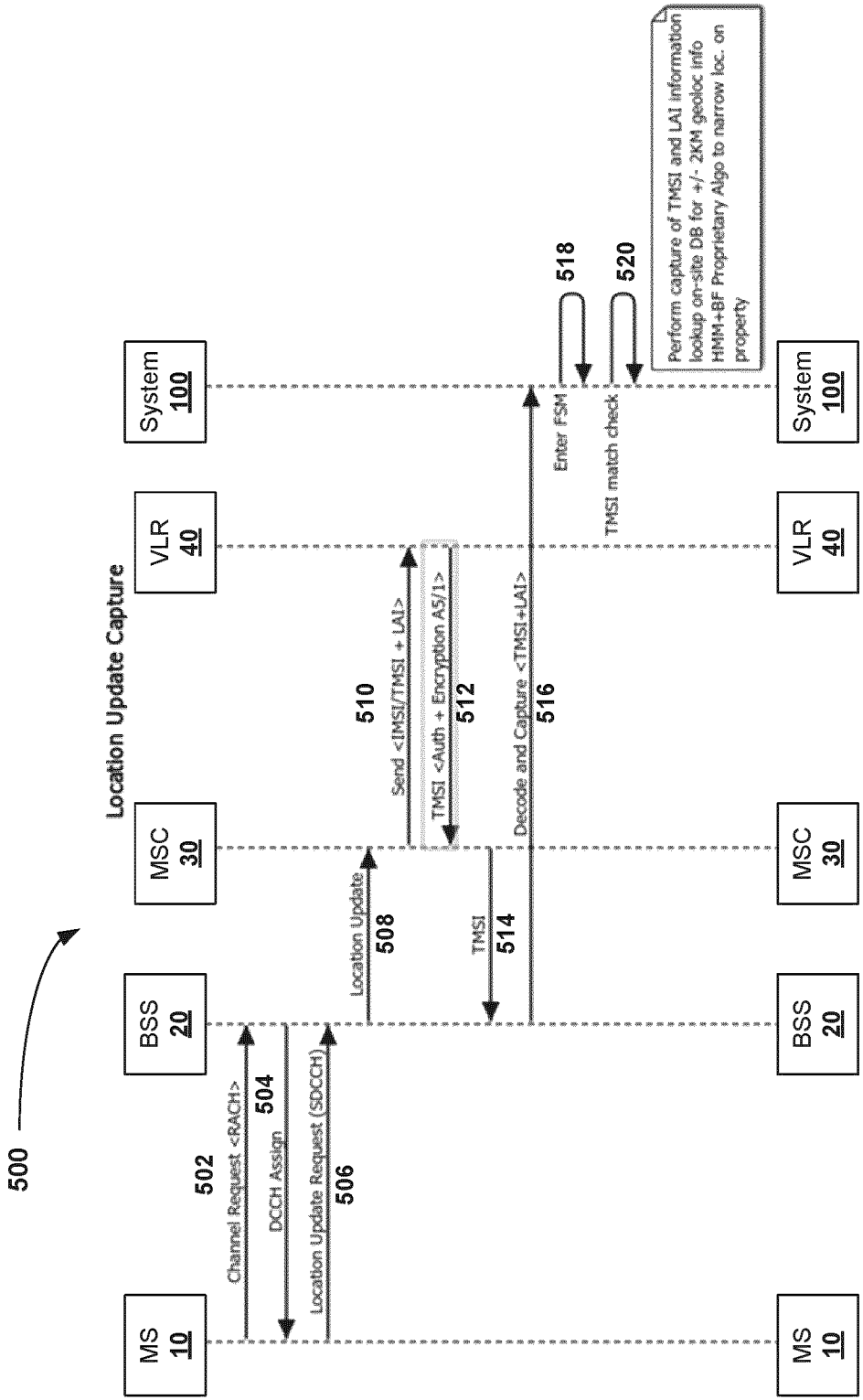
FIG. 5 illustrates, in a sequence diagram, an example of a method of a location update capture, in accordance with some embodiments.

FIG. 5 illustrates, in a sequence diagram, an example of a method 500 of a location update capture, in accordance with some embodiments. The method 500 comprises the MS 10 sending a Channel Request <RACH> message 502 to the BSS 20. The BSS 20 sends a DCCH Assign message 504 to the MS 10. The MS 10 then sends a Location Update Request (SDCCH) message 506 to the BSS 20. The BSS 20 sends a Location Update message 508 to the MSC 30. The MSC 30 sends a Send <IMSI/TMSI+LAI> message 510 to the VLR 40. The VLR 40 sends a TMSI <Auth+Encryption A5/1> message to the MSC 30. The MSC 30 then sends 514 the TMSI to the BSS 20. The BSS 20 sends a Decode and Capture <TMSI+LAI> message to the system 100. The system 100 enters 518 FSM and checks 520 for a TMSI match. The system 100 performs the capture of TMSI and LAI information lookup using an on-site database (DB) 128 for +/−2 km geolocation information. Upon TMSI match checking, the application of a Hidden Markov Model (HMM) and Bayesian Filter (BF) may be used to improve distance and location trajectory calculations, consequently narrowing a 2 km distance to a value around approximately 500 m (centered at the antenna) at most dependent on terrain and antennae properties.

Figure 6:
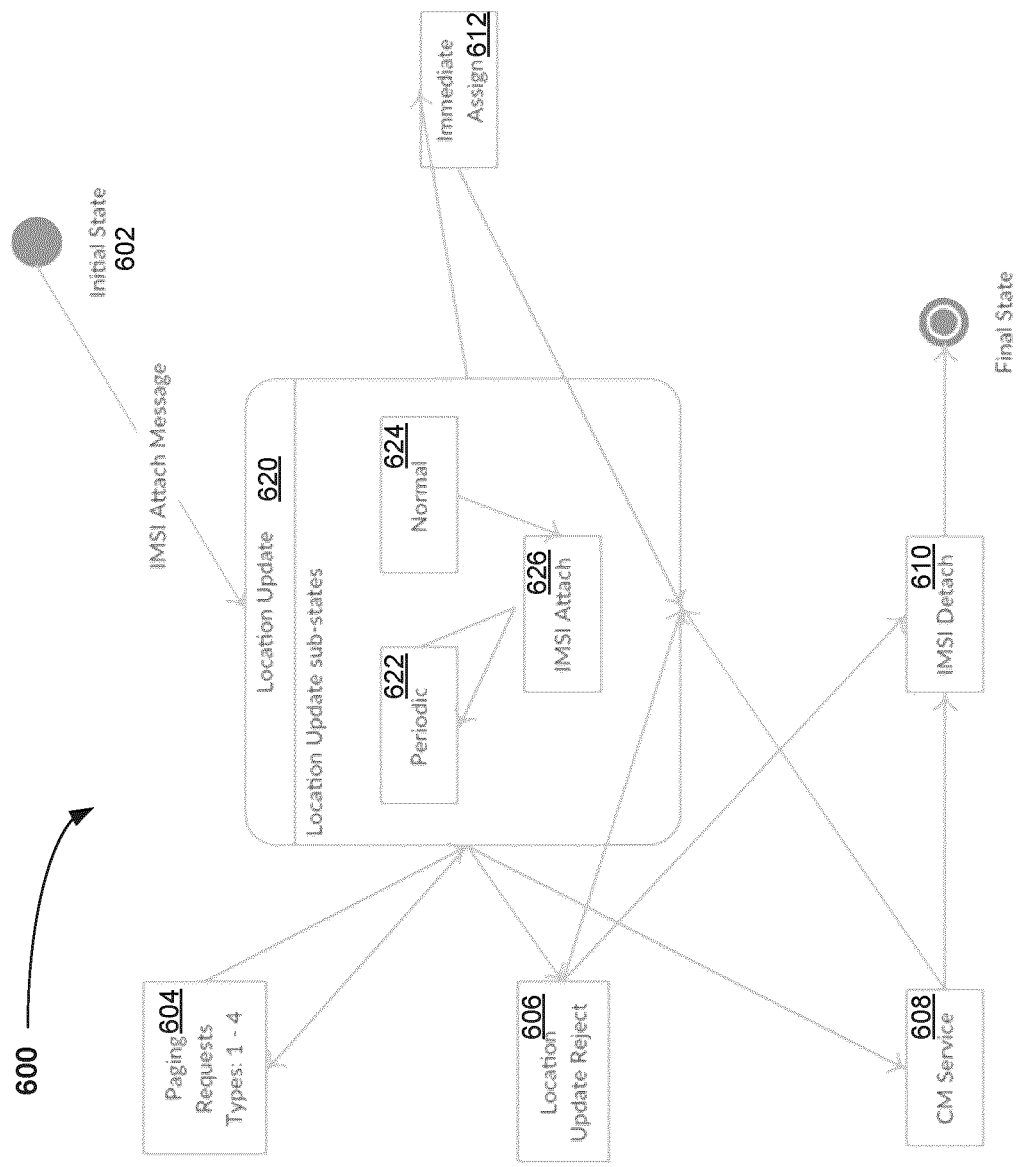
FIG. 6 illustrates, in a state transition diagram, an example of a state interaction for Global Systems for Mobile communication (GSM) packets as captured in a Finite State Machine (FSM), in accordance with some embodiments.

FIG. 6 illustrates, in a state transition diagram, an example of a state interaction 600 for GSM packets as captured in a FSM, in accordance with some embodiments. The states shown include an initial state 602, a paging requests types state 604, a location update reject state 606, a CM service state 608, an IMSI detach state 610, an immediate assign state 612 and a location update state 620. The location update state includes a periodic sub-state 622, a normal sub-state 624 and a IMSI attach sub-state 626. The initial state 602 reflects a MS on a property as seen in an IMSI Attach message. The device (MS) may transition to any of the states. During a state transition to a location update state, the HMM and BF system may determine a location of the device. The state interaction 600 may then be inputted into a machine learning (ML) algorithm for position determination.

In some embodiments, the tracking system 100 may include multiple antennae on a single cell tower. Such additional antennae (coherent antennae) will improve accuracy as further described below.

Figure 7:
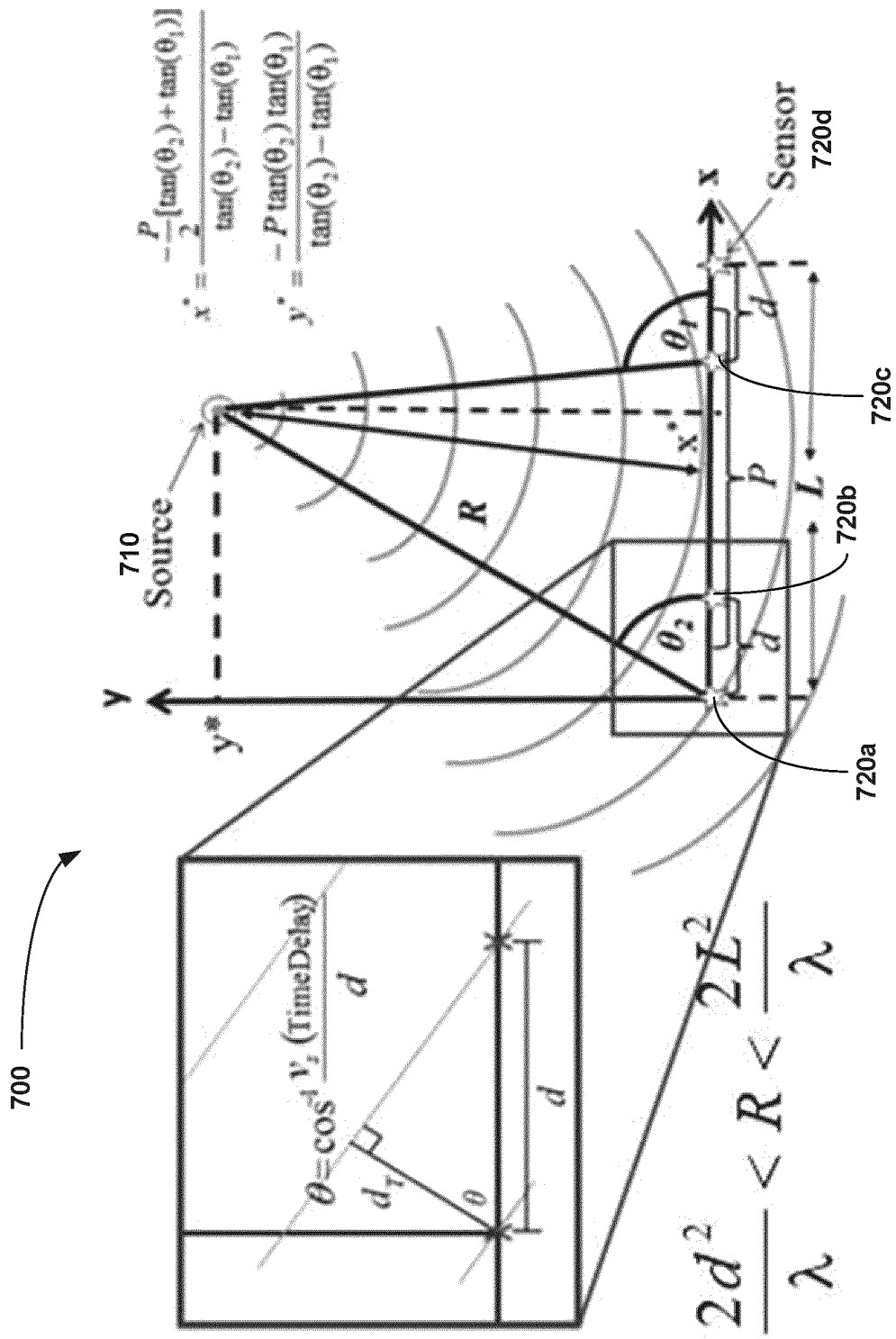
FIG. 7 illustrates a model for angle of arrival (AOA) of a cellular signal, in accordance with some embodiments.

FIG. 7 illustrates a model for angle of arrival (AOA) of a cellular signal 700, in accordance with some embodiments. FIG. 7 shows a brief image of a configuration using AOA estimation, where each node labeled sensor is one of the coherent antennae. The antennae would be configured in an array (not shown) designed for a tracking algorithm (e.g., such as MUSIC) to monitor movement by an intruder on the property.

In this example, a source 710 is be detected by sensors (e.g., antennae) 720a to 720d. Angles Theta1 and Theta1 are the respective angles from source 710 to the sensors 720a and 720c. d is the distance between sensors 720a and 720b, and between sensors 720c and 720d. P is the distance between the midpoints between the two sensor groups 720a, 720b and 720c, 720d. L is the distance between sensors 720a and 720d. In this embodiment, P is 75% of L. R is the radius from the source 710 and a sensor (e.g., 720a). L is much smaller than R. y* and x* approximate the ground coordinates of the source 710 in this particular model. Using a GPS together with the tracking system 100 will allow for the actual approximate ground coordinates to be determine from the model's coordinates.

Location detection may benefit from a fused system based on electronic source position estimation techniques, such as Power on Arrival (POA), Angle of Arrival (AOA) and Time Difference of Arrival (TDOA). Such fusion may smooth out the anomalies, improve measurement and remove tail risk. POA and TDOA are well known techniques. An improved AOA technique, which is different than triangulation, removes the tail risk (i.e., anomalies) and together with GPS coordinates allows for a real time position estimation for the source 710. For example, by using several AOA samples over time, the position estimation may be improved over the traditional use of AOA. Through the use of multiple sample inputs into a BF, a better position than that given by a regular sensor (e.g., antenna 112) may be statistically inferred. In some embodiments, the GR-GSM 122 may receive multiple sample inputs and use a BF to filter out outlier positons. The system may 1) preprocess each received signal (i.e., filter out noise), 2) compute a conditional probability that a packet (i.e., signal) is from a device in a particular location, and 3) input the conditional probability of each packet sampled into the BF. The BF will then output a likelihood that the device is in a given location (based on its sampled signal packets).

In some embodiments, the system 100 can apply real-time video to the process. By using Real-Time Communication (RTC) protocols, the use of video and cameras to identify people's faces (facial recognition) can be enabled using Machine Vision techniques. The same process may also be used to identify vehicle License Plates (Registration Plates) and automatically detect if a person or car should be allowed to visit the premises. For example, a camera may be used as a voter after the system locates a potential intruder device based on signalling (as will be described in more detail below). In some embodiments, once the system determines that an intruder device is present, the system may record video of the location where the intruder device is estimated to be.

In some embodiments, the system 100, can also listen to BLE devices. In cases where users are given name Identification Cards with a picture of themselves on the card, a Bluetooth™ device may be attached to the ID card which can be picked up by the system 100 platform. The identity of the person may be confirmed if the person's picture on the ID card is the same by showing a picture of the person on the computer. Also, since there are instances in agriculture where individuals are allowed to enter properties after a given period (quarantine period), the system 100 can be used to enforce these rules. In some embodiments, the BLE device may be associated with a photograph of an owner of the device. A security monitor may display the photograph once the BLE device is detected. In some embodiments, the BLE device may be whitelisted in a database, and thus, the device is not an intruder and the photograph may be displayed to a premises security as verification of the owner of the device. In some embodiments, the BLE device may be blacklisted in a database, and thus, the device is considered an intruder device and any available photograph may be used to assist security with locating the individual.

The system 100 can be used as a method of disease traceability for individuals who often visit farm premises and maybe vectors of disease spread. Since the system 100 can be used by many farmers, it is possible that if a farmer is part of an association, then that association group can create a network of movements. This would make it possible to identify phone characteristics and track a mobile phone as it moves around farm properties.

This type of movement tracking can also be applied outside of agriculture and applied to other sectors such as in mining facilities, personal cottages, and other sectors which require an intrusion detection system where assets are expensive. In some embodiments, the device movement may be tracked and stored in a database for later analysis. Such later analysis may allow for investigation of movement of identified devices (whitelisted or otherwise) throughout locations areas (e.g., rooms, buildings, etc.) in a relatively larger premises. In some embodiments, tracked movement of devices may be timestamped.

The improved AOA described above may be considered as an extrapolation of the solution taught above, along with confirmation via the foregoing location methods.

Figure 8:
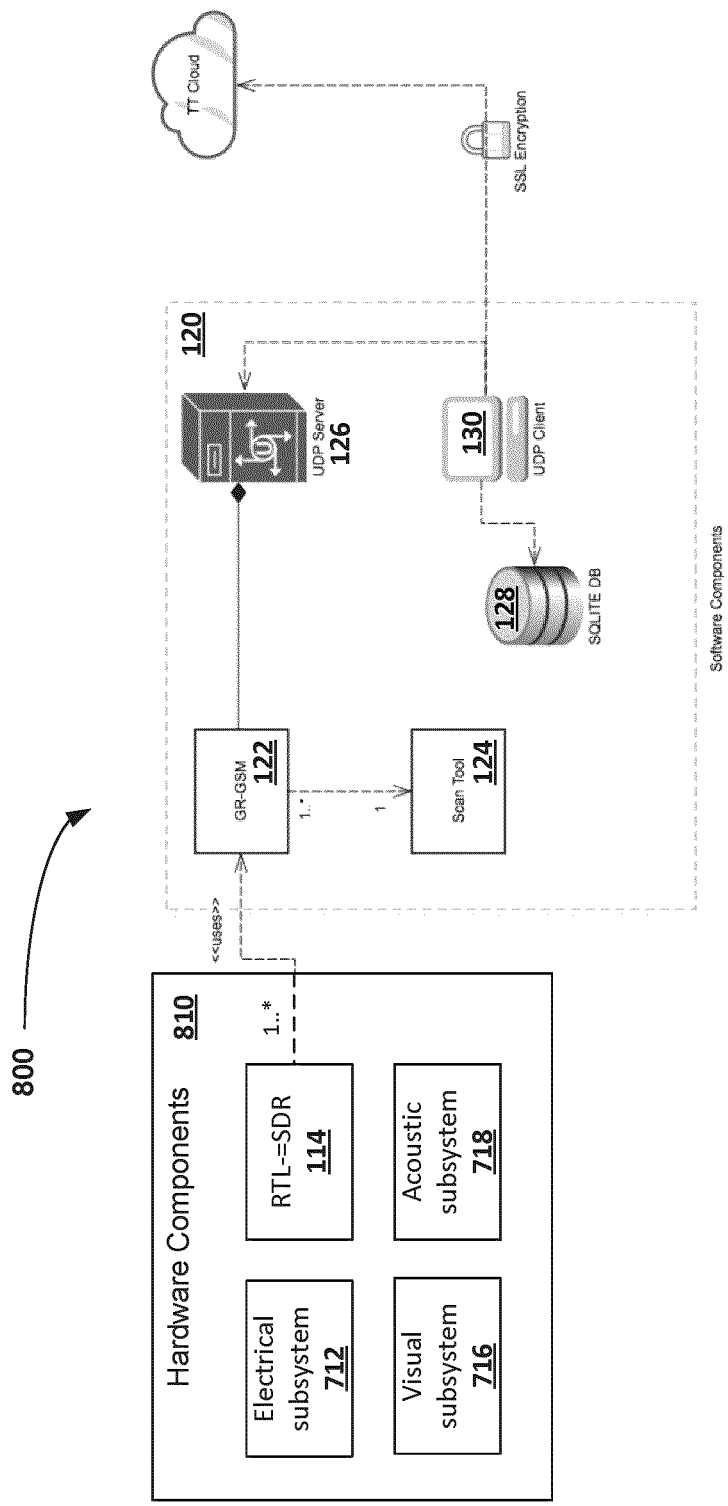
FIG. 8 illustrates, in a schematic diagram, another example of a tracking system, in accordance with some embodiments.

FIG. 8 illustrates, in a schematic diagram, another example of a tracking system 800, in accordance with some embodiments. The system 800 includes HW 810 components and the SW 120 components. The HW 820 components include an electrical subsystem 812 (which may include one or more antennae, radar, GPS, etc.), one or more RTL-SDR devices 114, a visual subsystem 816 (which may include one or more cameras (e.g., night vision, infra-red, thermal, etc.) and an acoustic subsystem 818 (which may include one or more microphones). In some embodiments, the tracking system 800 may be used to detect drones on the property (i.e., airspace over the property). Detections of drones may be performed on various levels: Electrical-Optical Isolation (EO), Radar, GPS and Acoustics (referred to as detection systems). A blended model may be applied to the system 800 to allow for a voting-based subsystem to determine the accuracy of detection for any make and model of drone (i.e., fusing/blending the various detection systems).

In some embodiment, an example of a voting-based subsystem would include principle component analysis (PCA) methods together with a hidden Markov model to determine better feature sets in the future. Data from each subsystem in the system 100, 800 is collected and placed in a database. With a large data set, it can be difficult to determine what sets of data are important and what sets are not. PCA methods may be employed (such as random forest and support vector machines) to isolate important features from the non-important features. A machine learning model may be generated by pre-seeding data.

In some embodiments, devices may be whitelisted in order to process fewer detected devices. I.e., for efficiency, the system may be set up to only be concerned with catching intruder devices (i.e., not on whitelist).

In some embodiments, messaging may be analyzed using a supervised machine learning model. A sample set of mobile devices may be tracked to train the system based on incoming data from the sample set. PCA methods may be applied to determine relevant features to extract. Based on the training of the model using the sample data, a supervised training will allow for the labelling of feature values. I.e., the model will be trained to know what data represents an intruder versus not an intruder.

In some embodiments, a machine learning model may also be trained to identify intruders based on sensor input from the video and acoustic/audio subsystems. The model may be trained (using supervised learning and tagging) to determine images and/or acoustic sounds that suggest a likelihood that an intruder is present. In some embodiments, the different weights may be dynamically assigned to each subsystem or sensors within a subsystem based on time or environmental conditions such as sunlight. For example, at night, infra-red sensor may be given more weight than regular video.

In some embodiments, triple modular redundancy may be employed to allow for a voting system among sensor subsystems. For example, an electrical subsystem may detect wireless messaging, a video subsystem may detect video and an audio subsystem may detect audio. Thus, intruders in a premises may be detected in one or more ways. If one subsystem cannot determine with a sufficiently high probability that an intruder is present, the other subsystems may compensate. If subsystems cannot agree whether or not there is an intruder present, each subsystem may be set to vote. In some embodiments, different subsystems may have different weights assigned to their determination.

In some embodiments, the different subsystems may share their determinations (together with the weight assigned to the determinations based on time and environmental conditions) to assist with determining a likelihood that an intruder is present. For example, a data pipeline streams all data and merges the data with tags from each stream. Machine learning is applied to tagging (used with voting) to obtain information needed from the coalesced data (used to confirm location). Assigned weights may provide an indication of which data is more accurate, and therefore should be given more weight during voting.

In some embodiments, distance measurement for video data may be calibrated during visual setup. Known acoustic distance measurements may be applied for acoustic data, such as using Doppler effect, etc.

EO isolation may be performed via infrared and night-vision cameras attached to a swivel to provide tracking of drones via object recognition and detection. As known in the art, detection and recognition of a drone may be performed by recognizing features of the drone (e.g., cameras, propellers, shape, etc.). An improved drone detection and recognition system may track the Hessian to track features such as the "corners" of an image. It should be understood that in machine learning, "corners" may be defined as strong derivatives in two orthogonal directions. An example of a calculation of the Hessian about x may be: Hessian Matrix Calculation for Image F at point x(x1,x2):

$$H_x = \begin{bmatrix} \frac{\partial^2 f}{\partial x_1^2} & \frac{\partial^2 f}{\partial x_1 \partial x_2} \\ \frac{\partial^2 f}{\partial x_1 \partial x_2} & \frac{\partial^2 f}{\partial x_2^2} \end{bmatrix}$$

Once a drone is detected, tracking may be performed via Kalman filtering. This tracking is performed as the system 800 is partially estimating the position of the drone(s) as they fly through the airspace. This mitigates the background noise providing highly accurate measurements to the location of the drone. Once GPS is coupled with Radar, accuracy improves within a 95% confidence interval (CI).

Figure 9:
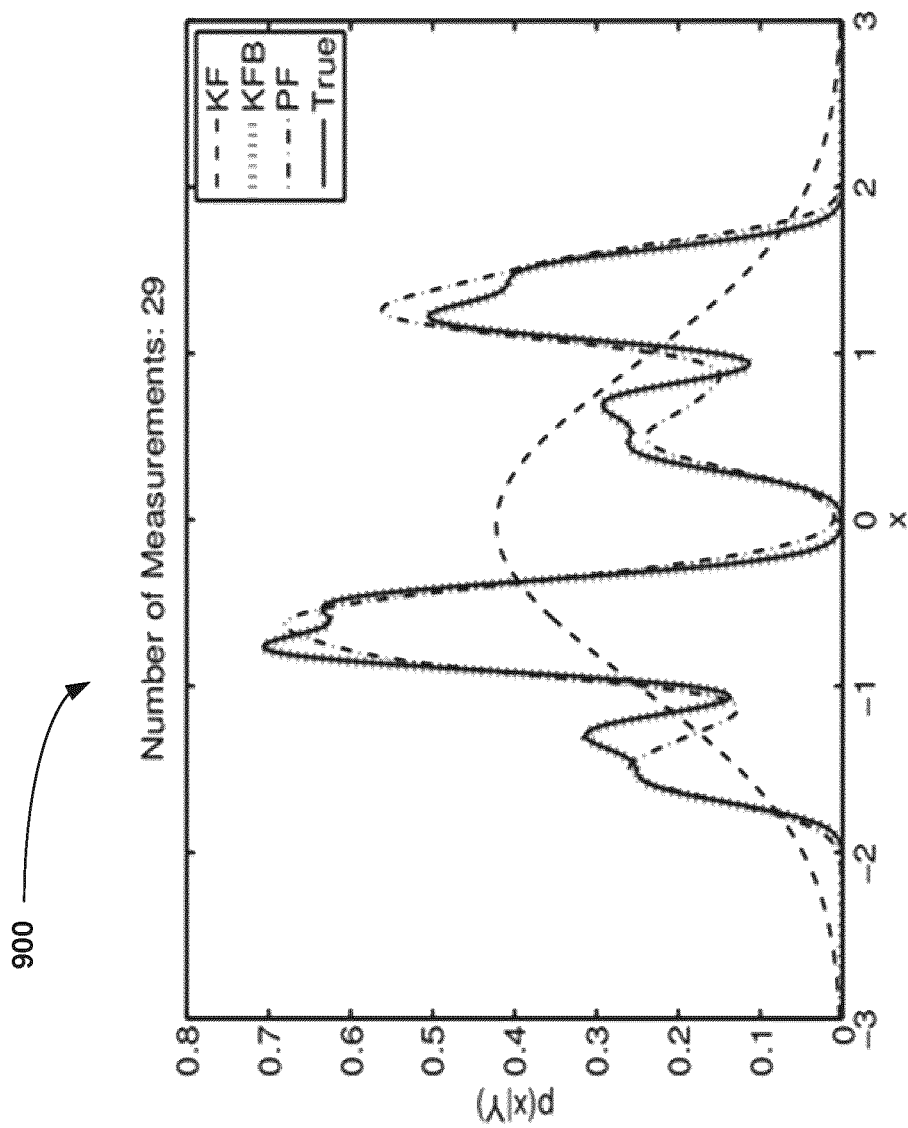
FIG. 9 illustrates, in a graph, an example of 29 measurements for the probability distribution function (PDF) of Kalman filter (KF) estimation, in accordance with some embodiments.

FIG. 9 illustrates, in a graph, an example of 29 measurements for the probability distribution function (PDF) of Kalman filter (KF) estimation 900, in accordance with some embodiments. A normal distribution curve 910 is seen with mean=0 (this is the initial measurement for the KF filter at the start). After 29 measurement samples over sample time T=t with multiple sensors the probability function (PF) curve 920 is shown (which is the current estimation). The Kalman filter bias (KFB) curve 930 is overlaid and shows how confident the latest measurement is with respect to the previous measurement: the more accurate, the fewer measurements needed; the less accurate, then more measurements are needed. The True curve 940 is overlaid to show the accuracy of the measurements.

The tracking system 800 has the ability to utilize 4 antennae using coherent software defined radio (SDR). It should be noted that more or fewer antennae may be used. Coherent SDR is intended to mean that all 4 antennae (or some configuration/permutation) coordinate their efforts to a particular goal. In some embodiments, an ad-hoc radar system may be emulated by using two of the antennae to send packets out and two antennae to receive packets in. Time calculations can be performed to determine distance. Based on the associated shape (signature) of the data, a determination may be made against a database of drone signatures if a particular drone is in the airspace, the associated properties of the drone, and its distance at the time of detection.

In some embodiments, the tracking system 800 may also employ active detection (i.e., active solutions) to rid the airspace of a threat (e.g., an adversarial drone (AD)). Various drones emit GPS signals and all emit acoustics via their motors and propellers. This information, coupled with the aforementioned isolation models, can allow the tracking system 800 to send another drone (e.g., Containment Drone (CD)) to quietly and efficiently cause disruptions to the ADs onboard systems. Most commercial drones fly by two protocols: WiFi and Radio Uplink. Communications to the drone operator can be selected (e.g., WiFi vs. Radio Uplink) on particular drones. Due to Federal Communications Commission (FCC) regulations, and efficiency/cost purposes, drones are limited to these protocols. By having the CD fly by cellular 3G/4G/5G services (via a private local network), the CD is not detected by "detector-detector" systems, and the CD's range may be increased by issuing the use of a customized cellular network for the given airspace. In order to communicate with the CD, the tracking system 800 may also include a communication (land-to-air) subsystem that includes radio communication capabilities (WiFi, Radio Uplink, private cellular network, etc.) between the system 800 and the CD.

The maximum range for WiFi is 2.0 Km and Radio Uplink (low frequency) is around 5.4 Km. Theoretically, wherever a cell tower is present, communications between the tracking system 800 and the CD is possible, greatly outpacing any AD. Upon detection of the AD via Isolation Models (e.g., using camera and acoustic subsystems), packet dissemination of GPS signals for particular drones (e.g., manufactured drones) can be accomplished. For example, packet inter-arrival time estimations can be used to together to create a picture to determine the location of not only the drone but also of the adversarial attacker. The tracking system 800 CD can then fly to the location of the AD and jam WiFI, GPS or Radio Uplink frequencies among other operations. Jamming is very straight forward: for example, simply flooding the communications link with bogus randomly generated packets. It should be noted that different manufacturers can use different signalling, which allows for the detection of different drones.

Figure 10:
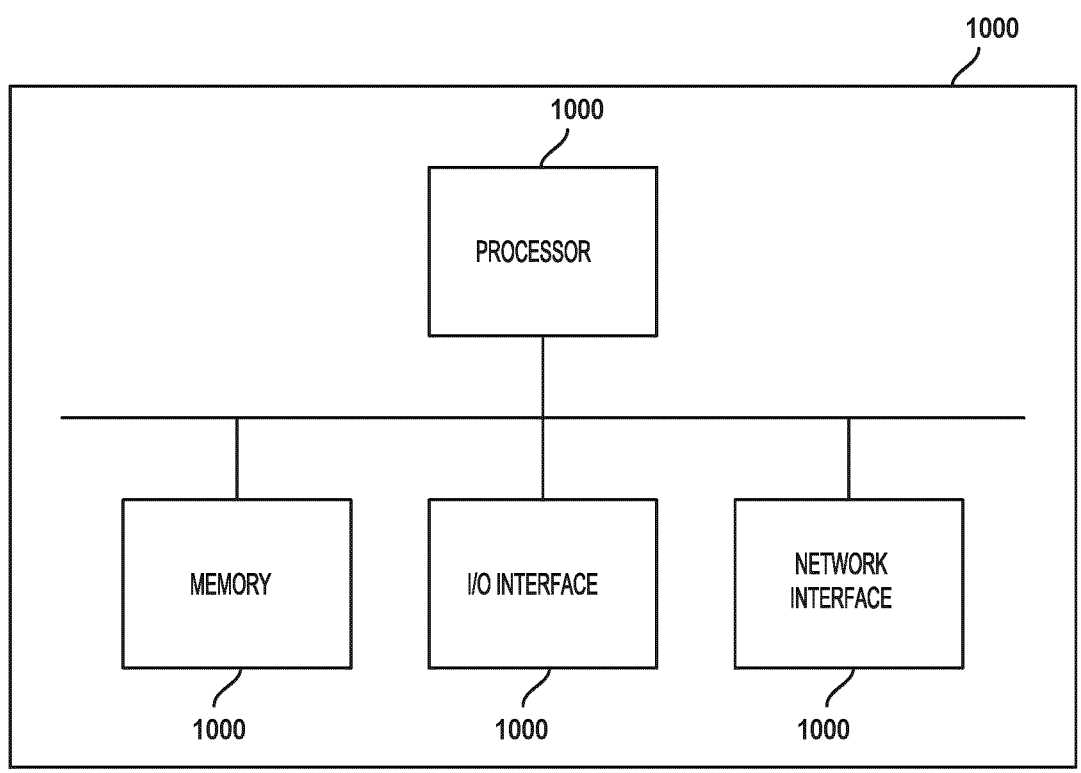
FIG. 10 is a schematic diagram of a computing device such as a server.

FIG. 10 is a schematic diagram of a computing device 1000 such as a server. As depicted, the computing device includes at least one processor 1002, memory 1004, at least one I/O interface 1006, and at least one network interface 1008.

Processor 1002 may be an Intel or AMD x86 or x64, PowerPC, ARM processor, or the like. Memory 1004 may include a suitable combination of computer memory that is located either internally or externally such as, for example, random-access memory (RAM), read-only memory (ROM), compact disc read-only memory (CDROM).

Each I/O interface 1006 enables computing device 1000 to interconnect with one or more input devices, such as a keyboard, mouse, camera, touch screen and a microphone, or with one or more output devices such as a display screen and a speaker.

Each network interface 1008 enables computing device 1000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The foregoing discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for tracking mobile devices, the system comprising at least one processor and memory storing code which when executed by the at least one processor configure the at least one processor to:
receive a disassemble international mobile subscriber identity (IMSI) attach message from a base station, the disassemble IMSI attach message including an IMSI and a location area identity (LAI) associated with an identified mobile device;
identify the identified mobile device within a location area using the IMSI and LAI, wherein to determine the location area the at least one processor is configured to:
determine angles of arrival of the IMSI request message from the device to the at least two antennae that received the IMSI request message; and
determine approximate coordinates of the device based on the angles of arrival;
receive a decode and capture message from the base station, the decode and capture message including a temporary mobile subscriber identity (TMSI) and LAI associated with an unidentified mobile device; and
identify the unidentified mobile device as being the identified mobile device within the location area.

2. The system as claimed in claim 1, comprising:
at least two antennae to receive the IMSI request message.

3. The system as claimed in claim 1, comprising:
at least one antenna to send the IMSI message.

4. The system as claimed in claim 1, wherein to determine the approximate coordinates, the at least one processor is configured to determine x and y coordinates wherein:
an x coordinate is defined by:

$$x^* = \frac{-\frac{P}{2}[\tan(\theta_2) + \tan(\theta_1)]}{\tan(\theta_2) - \tan(\theta_1)};$$

and a y coordinate is defined by:

$$y^* = \frac{-P\tan(\theta_2)\tan(\theta_1)}{\tan(\theta_2) - \tan(\theta_1)}.$$

5. The system as claimed in claim 1, wherein at least one processor is configured to determine the position of a drone in an airspace over the premises via Kalman filtering.

6. A method of tracking mobile devices, the method comprising:

receiving a disassemble international mobile subscriber identity (IMSI) attach message from a base station, the disassemble IMSI attach message including an IMSI and a location area identity (LAI) associated with an identified mobile device;

identifying the identified mobile device within a location area using the IMSI and LAI, wherein the location area is determined by:
- determining angles of arrival of the IMSI request message from the device to the at least two antennae that received the IMSI request message; and
- determining approximate coordinates of the device based on the angles of arrival;

receiving a decode and capture message from the base station, the decode and capture message including a temporary mobile subscriber identity (TMSI) and LAI associated with an unidentified mobile device; and identifying the unidentified mobile device as being the identified mobile device within the location area.

7. The method as claimed in claim 6, wherein:
at least two antennae receive the IMSI request message.

8. The method as claimed in claim 6, wherein:
at least one antenna sends the IMSI message.

9. The method as claimed in claim 6, wherein to determine the approximate coordinates, x and y coordinates are determined wherein:

an x coordinate is defined by:

$$x^* = \frac{-\frac{P}{2}[\tan(\theta_2) + \tan(\theta_1)]}{\tan(\theta_2) - \tan(\theta_1)};$$

and
a y coordinate is defined by:

$$y^* = \frac{-P\tan(\theta_2)\tan(\theta_1)}{\tan(\theta_2) - \tan(\theta_1)}.$$

10. The method as claimed in claim 6, wherein the position of a drone in an airspace over the premises is determined via Kalman filtering.

* * * * *